April 22, 1941. J. FALCON Re. 21,775

CONVERTIBLE AUTOMOBILE BODY

Original Filed March 24, 1933 11 Sheets-Sheet 1

April 22, 1941. J. FALCON Re. 21,775

CONVERTIBLE AUTOMOBILE BODY

Original Filed March 24, 1933 11 Sheets-Sheet 2

Inventor

JERONIMO FALCON

By C. F. Wenderoth

Attorney

April 22, 1941. J. FALCON Re. 21,775

CONVERTIBLE AUTOMOBILE BODY

Original Filed March 24, 1938 11 Sheets-Sheet 3

Inventor
JERONIMO FALCON

By E. F. Wenderoth
Attorney

April 22, 1941. J. FALCON Re. 21,775
CONVERTIBLE AUTOMOBILE BODY
Original Filed March 24, 1938 11 Sheets-Sheet 4
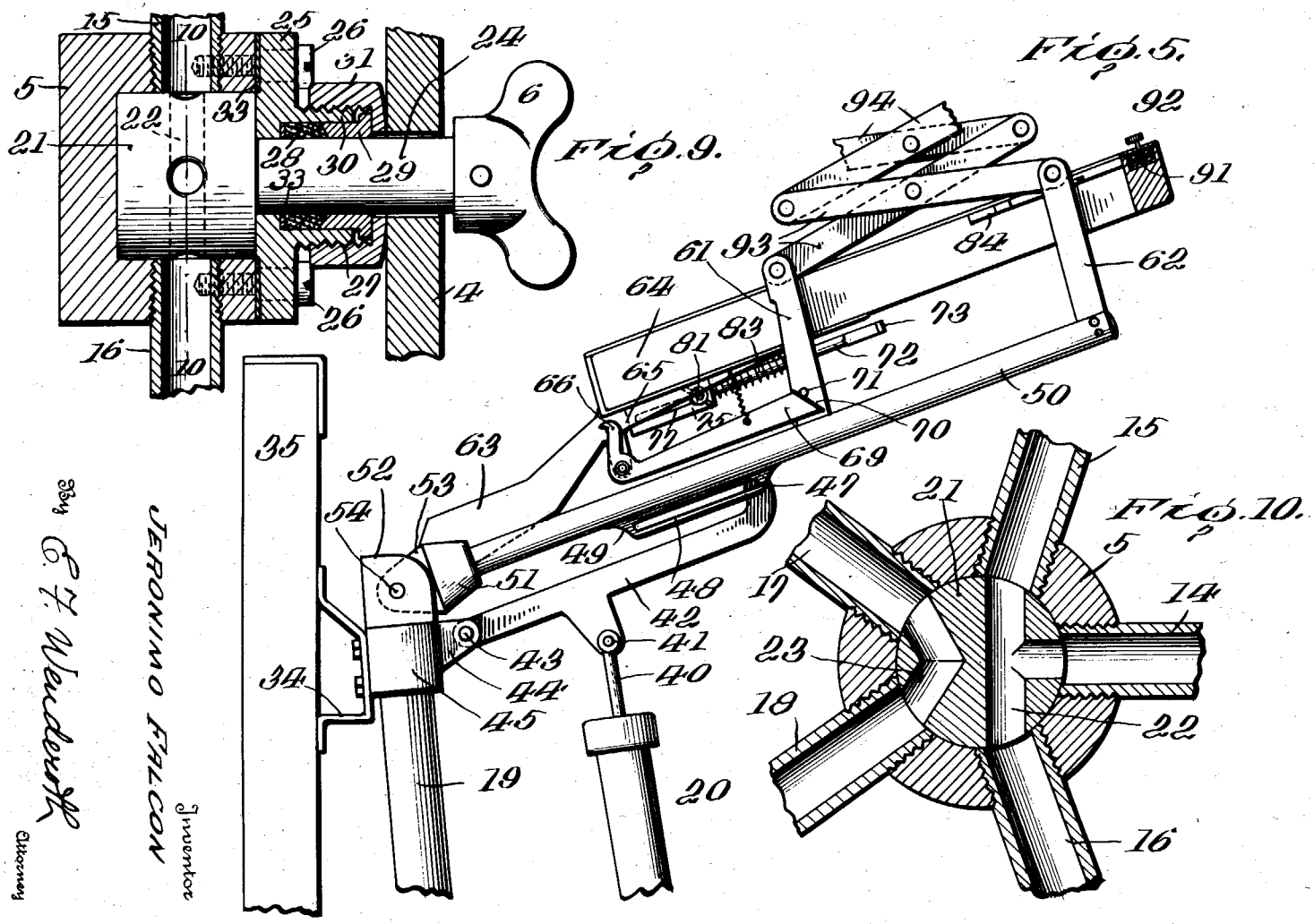
Inventor
JERONIMO FALCON
By E. F. Wenderoth
Attorney April 22, 1941. J. FALCON Re. 21,775
CONVERTIBLE AUTOMOBILE BODY
Original Filed March 24, 1933 11 Sheets-Sheet 5
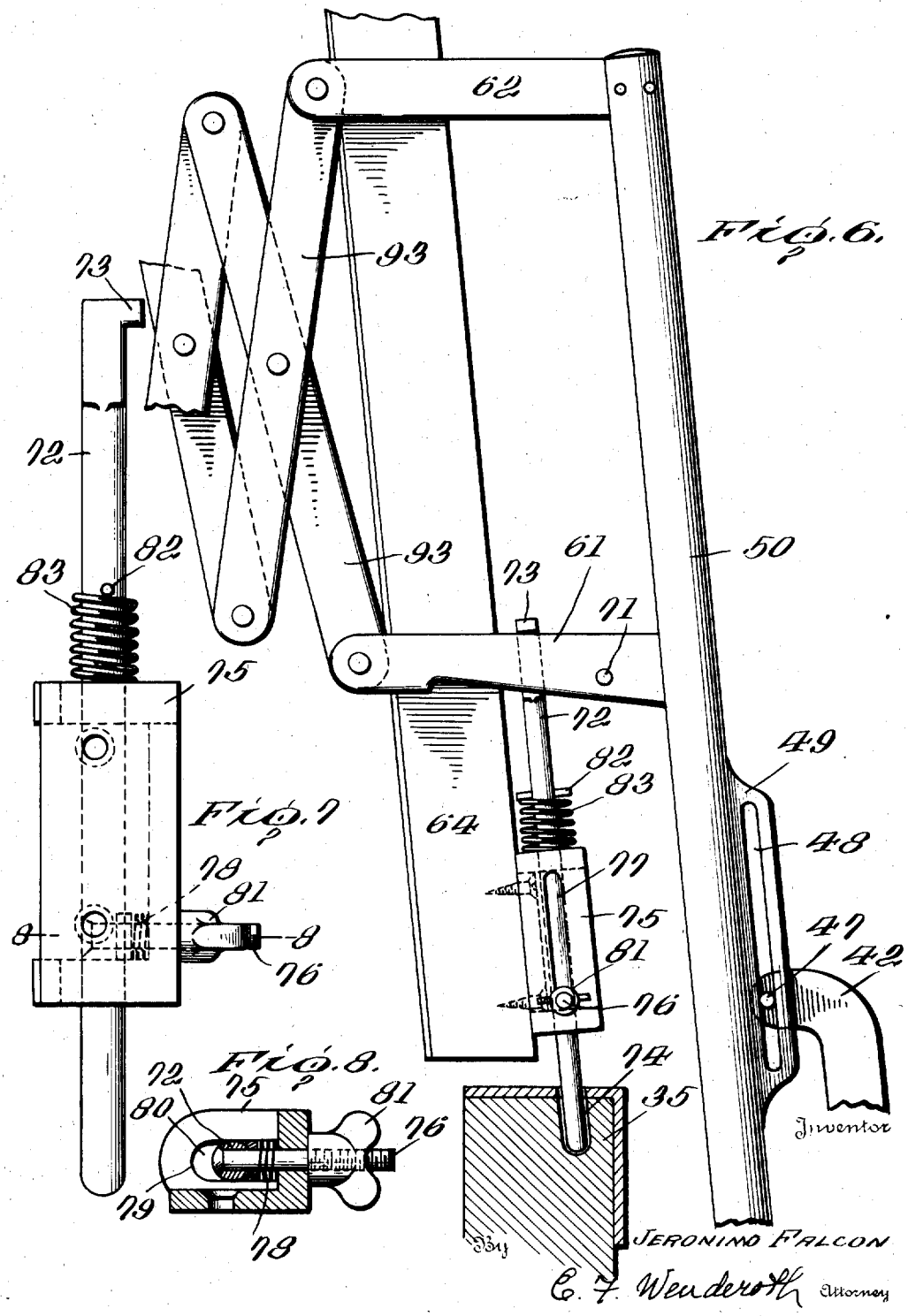

April 22, 1941. J. FALCON Re. 21,775

CONVERTIBLE AUTOMOBILE BODY

Original Filed March 24, 1933 11 Sheets-Sheet 6

Inventor

JERONIMO FALCON

By C. F. Wenderoth Attorney

CONVERTIBLE AUTOMOBILE BODY

Original Filed March 24, 1930 11 Sheets-Sheet 7

Inventor
JERONIMO FALCON

By E. F. Wenderoth
Attorney

April 22, 1941. J. FALCON Re. 21,775
CONVERTIBLE AUTOMOBILE BODY
Original Filed March 24, 1938 11 Sheets-Sheet 8
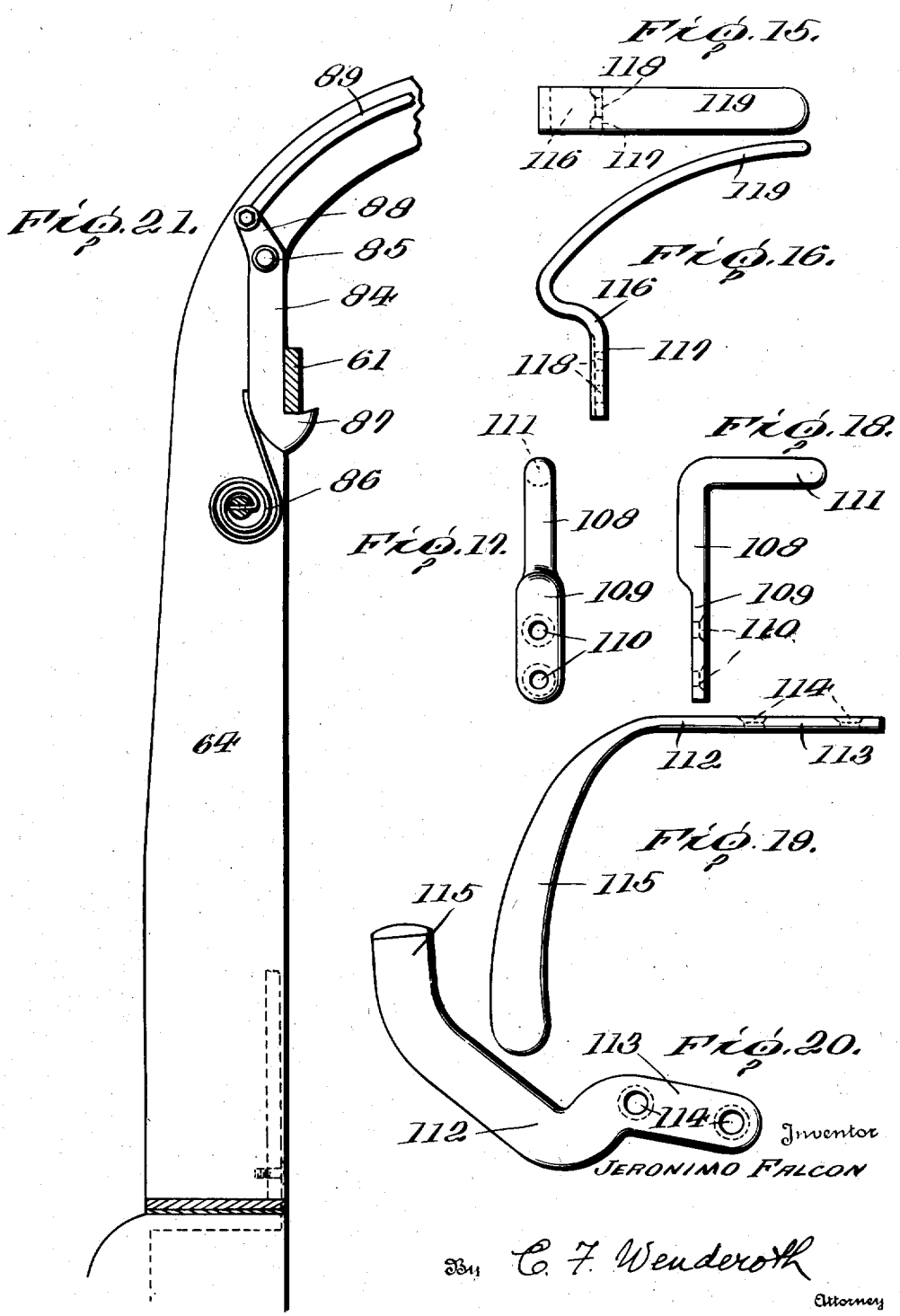

April 22, 1941. J. FALCON Re. 21,775

CONVERTIBLE AUTOMOBILE BODY

Original Filed March 24, 1938 11 Sheets-Sheet 9

Inventor
JERONIMO FALCON

By C. F. Wenderoth
Attorney

April 22, 1941. J. FALCON Re. 21,775
CONVERTIBLE AUTOMOBILE BODY
Original Filed March 24, 1938 11 Sheets-Sheet 10
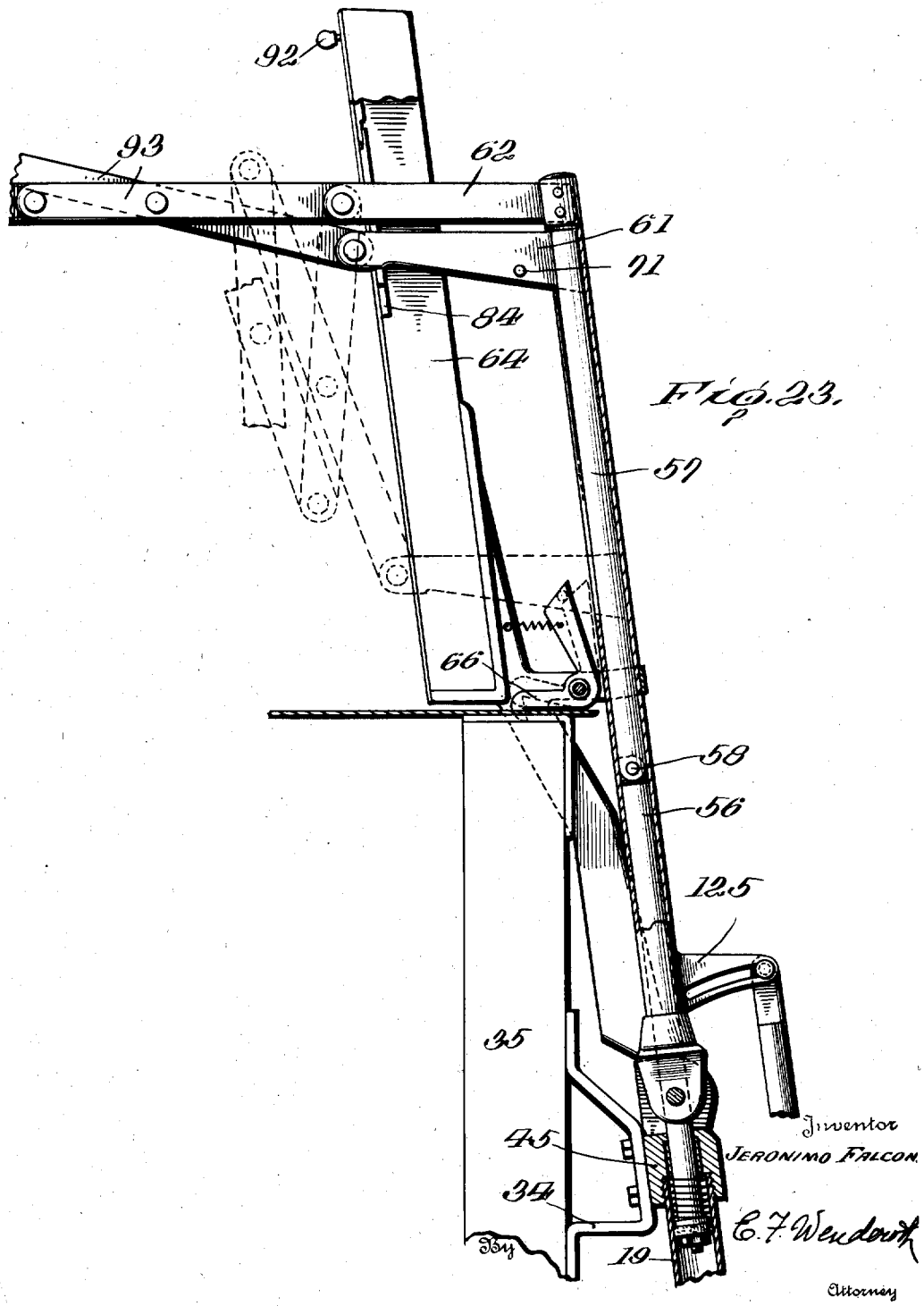

April 22, 1941. J. FALCON Re. 21,775
CONVERTIBLE AUTOMOBILE BODY
Original Filed March 24, 1938 11 Sheets-Sheet 11
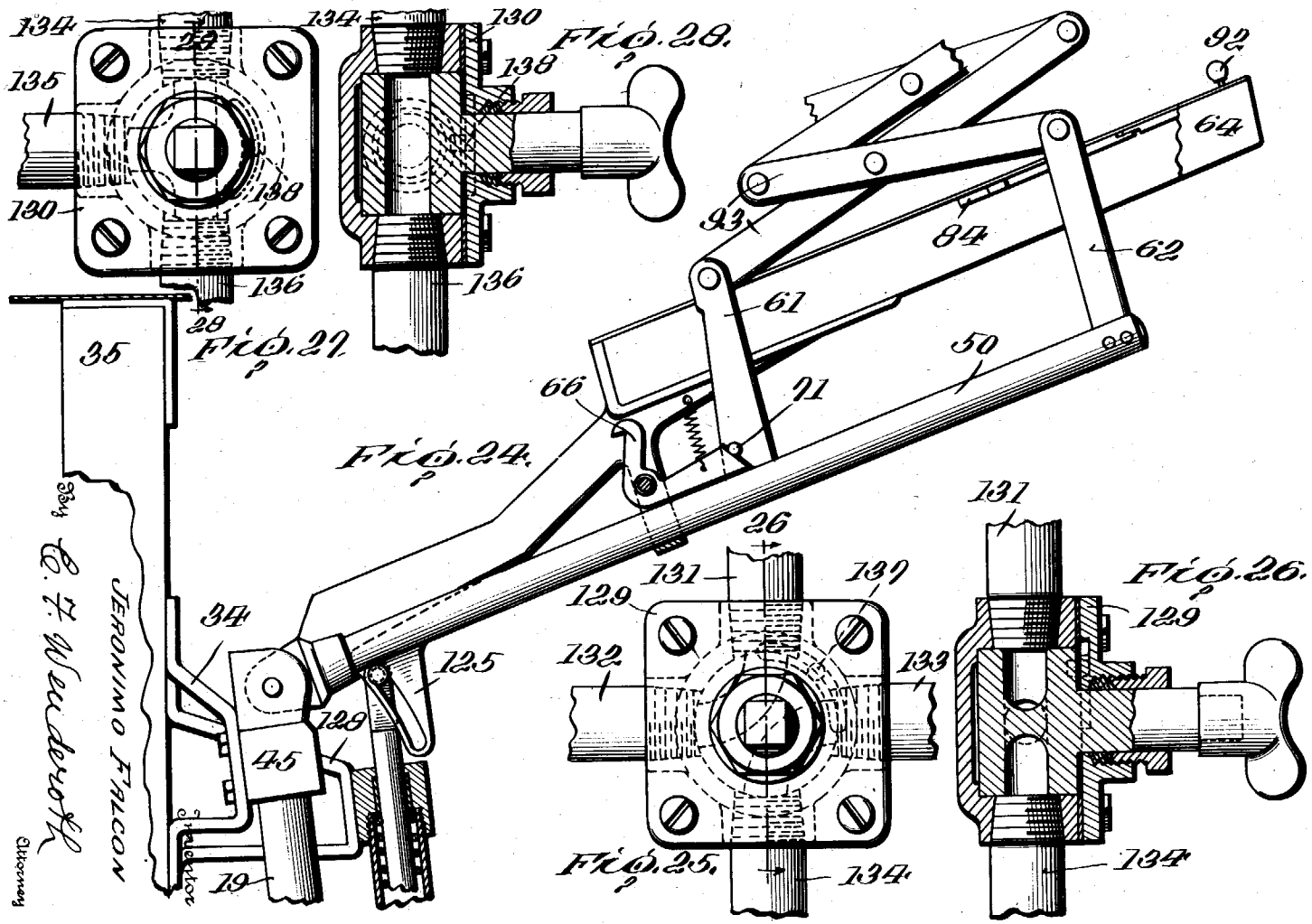

Reissued Apr. 22, 1941

Re. 21,775

UNITED STATES PATENT OFFICE 21,775

CONVERTIBLE AUTOMOBILE BODY

Jeronimo Falcon, Buenos Aires, Argentina

Original No. 2,169,340, dated August 15, 1939, Serial No. 197,947, March 24, 1938. Application for reissue January 3, 1941, Serial No. 373,795

11 Claims. (Cl. 296—117)

A principal object of the invention is to provide a convertible top construction for an automobile or similar vehicle which will facilitate the quick and easy conversion of an automobile from an open to a closed type and vice versa.

A further object of the invention is to provide a construction which is exceedingly simple in form and efficient in operation so that a single person may easily and quickly manipulate the top between its extended, collapsed and intermediate position with a minimum of effort.

A still further object of the invention is to provide an intermediate position for the top whereby the automobile may be converted to a so-called town car arrangement.

A feature of the invention is also the provision of means operable from the dashboard for automatically raising and extending the top construction.

A further object of the invention is the provision of a unique five way valve for operating the fluid power means for raising the top and for circulating the fluid means during the non-operating periods.

A still further object of the invention is the provision of new and improved means for locking the top at its extreme forwardly extended position and the provision of means for manipulating such locking means.

A further feature of the invention is the provision of a locking means for locking the top in its intermediate position.

A still further object of the invention is the provision of a latching means for locking the top in the positions of the top between the intermediate and the fully extended position and means whereby such latching means is automatically released when the top is in intermediate position and keeping such latching means out of operation during the positions between the intermediate position and the fully collapsed position.

A further feature of the invention is the provision of a new type of bows in connection with the lazy tongs construction whereby pinching of the fabric covering the top is prevented. With the above and other objects in view as will become apparent from the detailed description below some preferred embodiments of the invention are illustrated in the drawings, in which—

Figure $2^a$ is a partial cross sectional view illustrating one position of the valve controlling the transmission of fluid.

Figure $2^b$ is a similar view illustrating another position of the valve.

Figure $2^c$ is a similar view illustrating a still further position of the valve.

Figure 3:
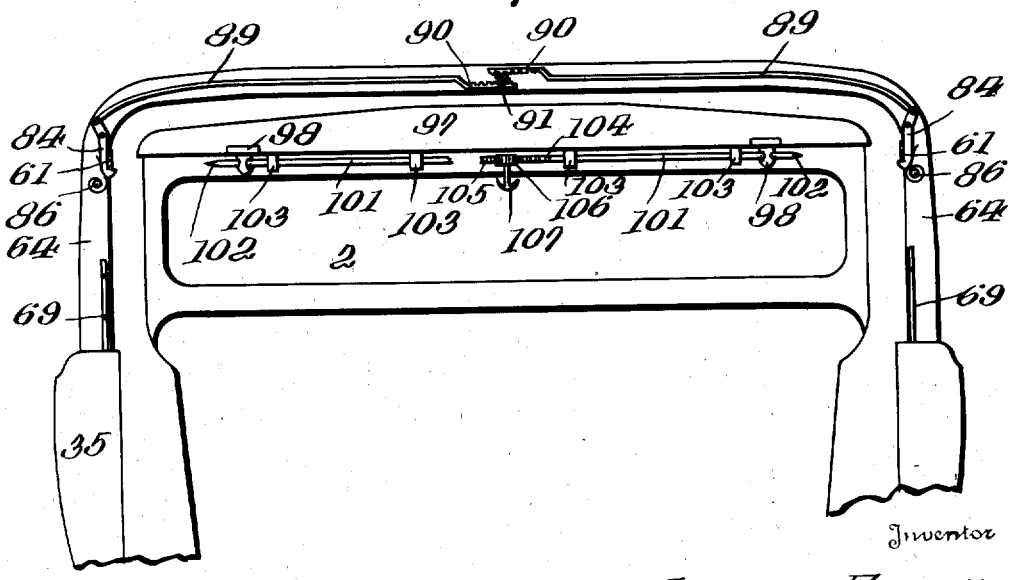

Figure 3 is an elevational view with parts in section illustrating the means for locking the top to the windshield and also the means for locking the sides of the lazy tongs.

Figure 4:
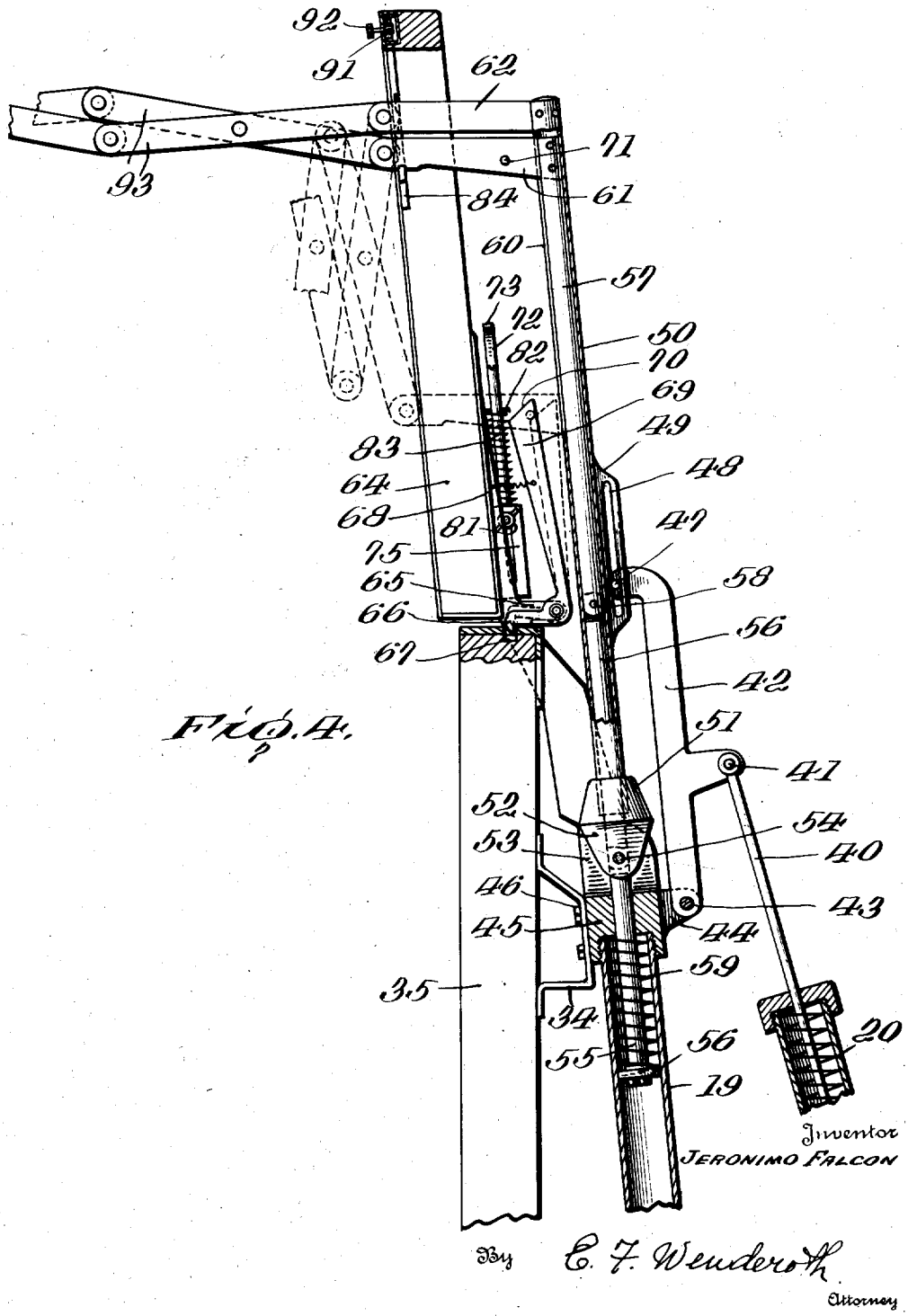

Figure 4 is a partial side elevational view with parts in section illustrating the means for actuating the lazy tongs and showing the lazy tongs in extended position.

Figure 5 is a similar view illustrating the parts in collapsed position.

Figure 6 is a partial side elevational view particularly illustrating the manner in which the parts are locked in order to hold the same in the intermediate position and thereby secure the town car appearance for the top.

Figure 7A:
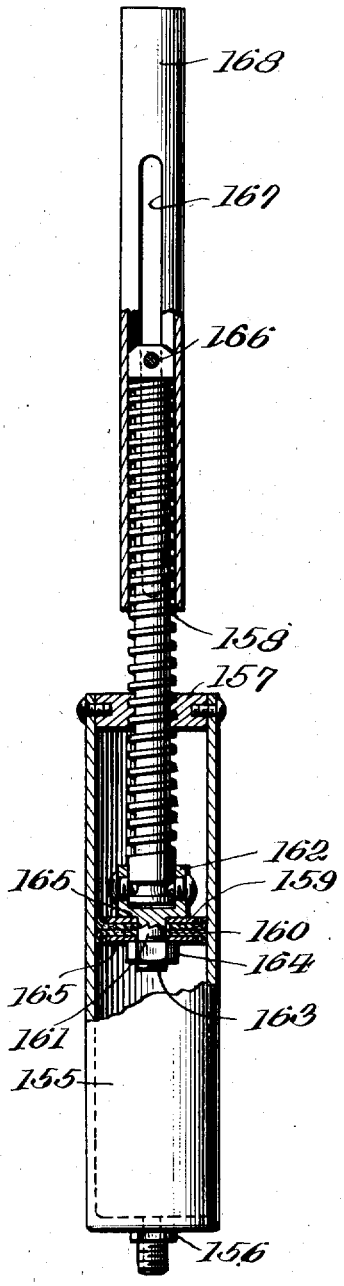

Figure 7 is a side elevational view of the sliding locking bolt used in locking the top in intermediate position.

Figure $7^a$ is a cross sectional view of a modified construction for placing the operating fluid under pressure.

Figure 8 is a cross sectional view taken on the section line 8—8 of Figure 7.

Figure 9 is a cross sectional view with parts in elevation of the five way valve.

Figure 10 is a cross section view taken on the line 10—10 of Figure 9.

Figure 11:
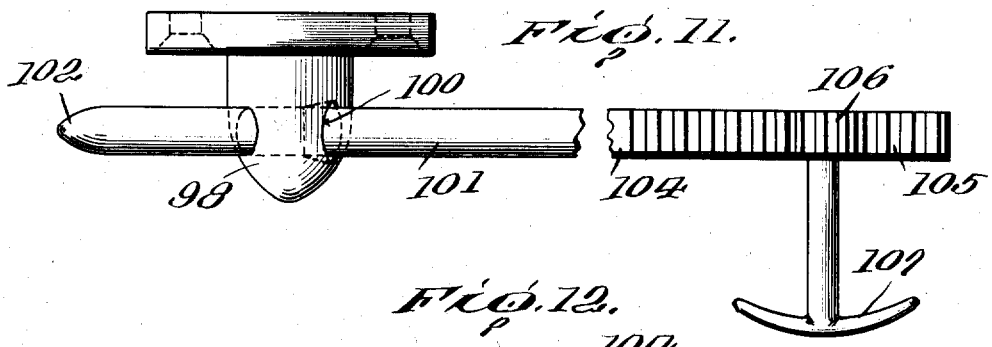

Figure 11 is a partial plan view of the windshield locking means.

Figure 12:
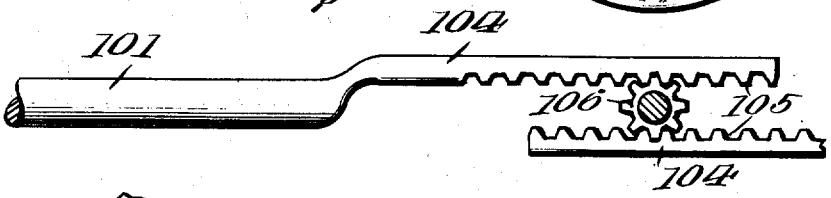

Figure 12 is a further partial front elevational view with portions in section of the windshield locking means and the operating means therefor.

Figure 13:
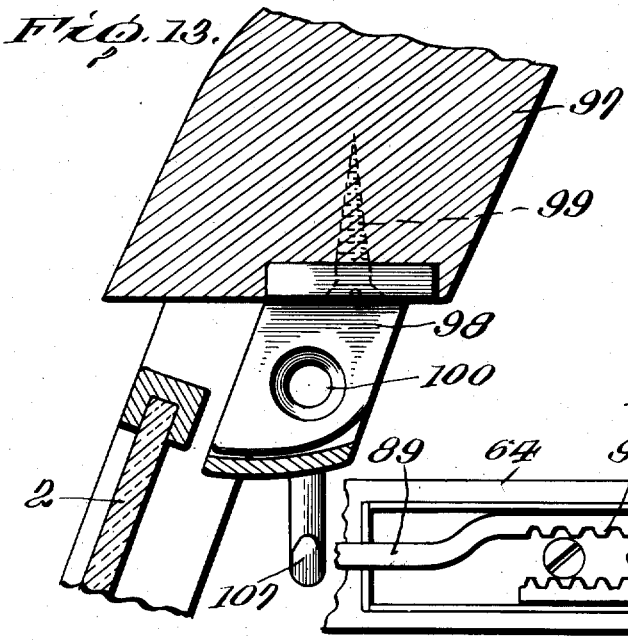

Figure 13 is a side elevational view of one of the receiving sockets for the windshield locking means.

Figure 14:
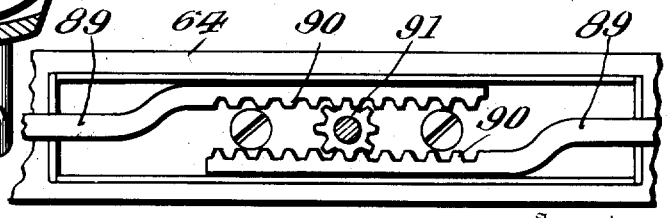

Figure 14 is a front elevational view of a part of the side locking means for locking the lazy tongs.

Figure 15 is a top plan view of one of the lazy tong extensions used.

Figure 16 is a side elevational view of the lazy tongs extension shown in Figure 15.

Figure 17 is a front elevational view of another form of lazy tongs extension or bow used.

Figure 18 is a side elevational view of the form of bow shown in Figure 17.

Figure 19 is a side elevational view of a further form of lazy tongs extension or bow used.

Figure 20 is a front elevational view of the form of box shown in Figure 19.

Figure 21 is a partial front elevational view of the side locking means utilized in connection with the operating means disclosed particularly in Figure 14.

Figure 22:
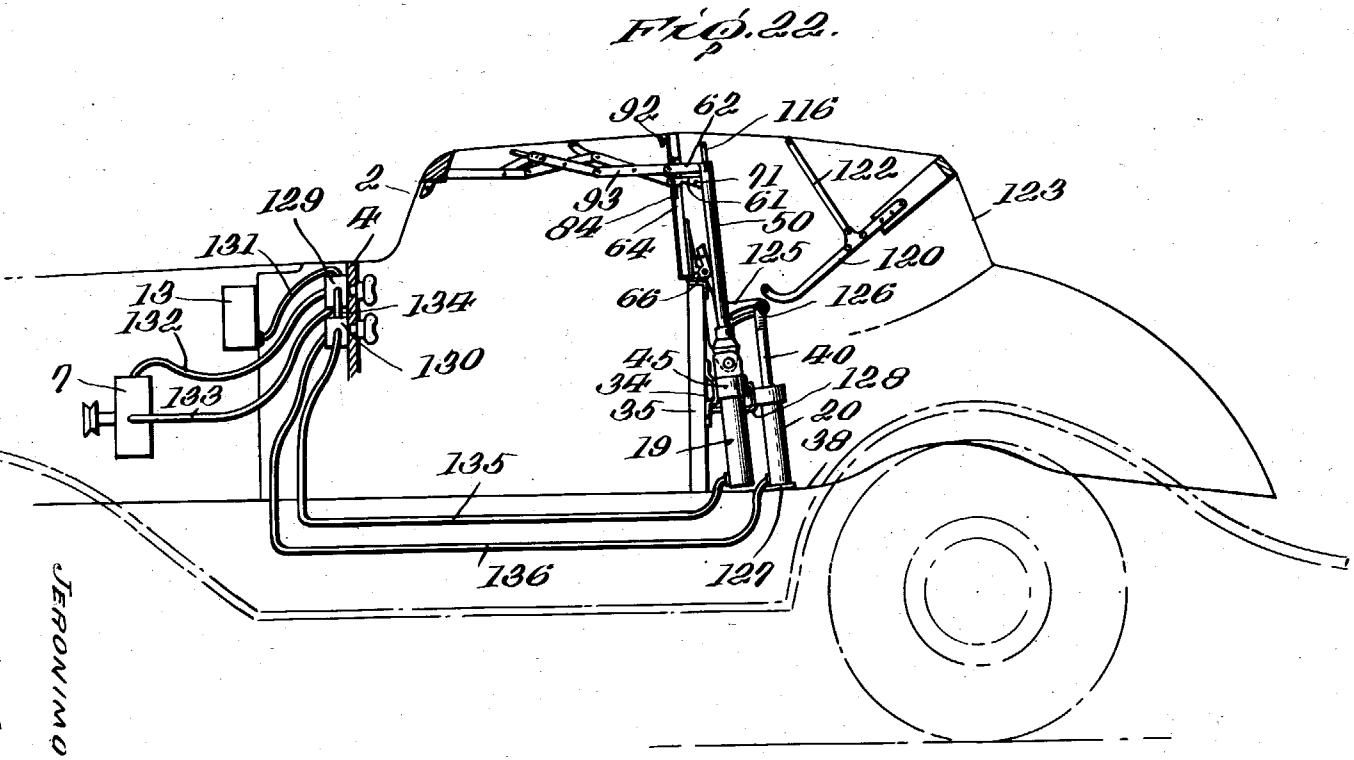

Figure 22 is a side elevational view of a portion of the automobile body with a modified construction of the top raising means and a modified construction of the fluid operating means.

Figure 23 is a side elevational view upon an enlarger scale of a portion of the top raising mechanism of the modification illustrated in Figure 22.

Figure 24 is a partial side elevational view of the mechanism shown in Figure 23 in collapsed position.

Figure 25 is a plan view of the four-way valve used in the modification illustrated in Figure 22.

Figure 26 is a cross sectional view taken on the section line 26—26 of Figure 25.

Figure 27 is a front plan view of the three-way valve used in the modification of Figure 22.

Figure 28 is a cross sectional view with parts in elevation taken on the section line 28—28 of Figure 27.

Figure 29:
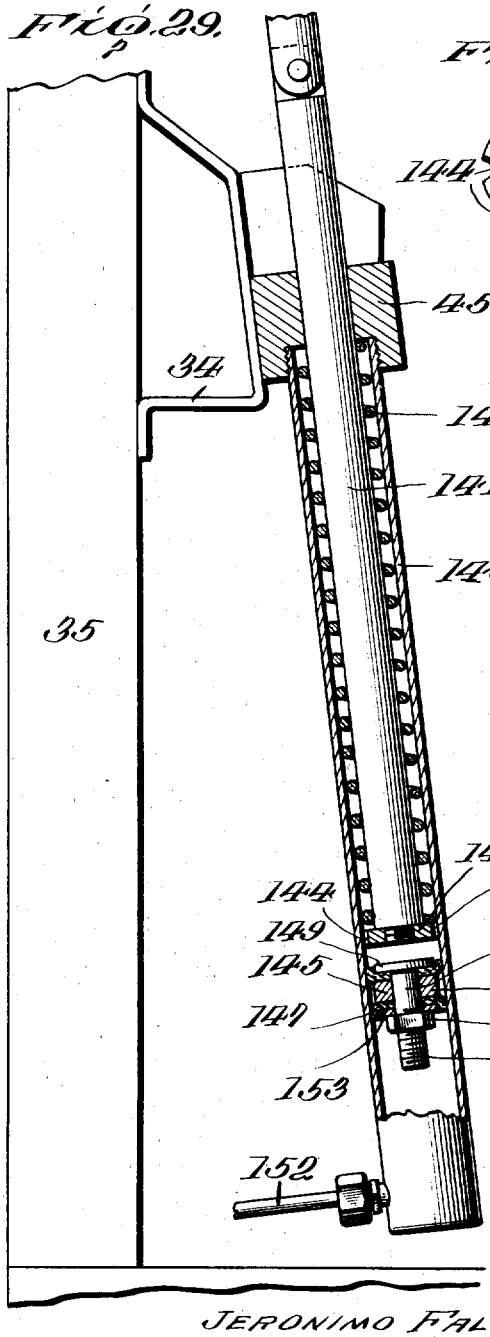
Figure 30:
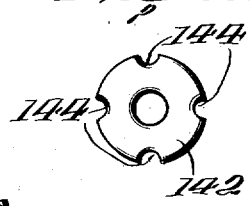

Figure 29 is a longitudinal sectional view showing a modified operating cylinder construction, and Figure 30 is a plan view of the plate attached to the end of the plunger reciprocating in the operating cylinder shown in Figure 29.

In the drawings in which like reference characters denote like parts 1 designates generally the body of a vehicle, which may be of any desired construction, preferably having an upright member such as a windshield 2 at its forward end which serves as a support for the forward end of the top structure which is indicated generally by the reference character 3. The dashboard of the vehicle is shown at 4 having mounted thereon the valve 5 with an operating connection 6 easily available to the driver of the vehicle. The valve 5 is of a particular construction which will be described more in detail hereinbelow.

The power operating means for raising the top construction comprises a pump 7 which may be of any desired type but is preferably of the rotary type and is driven from a rotating part of the engine of the automobile. The pump 7 may be directly connected with the rotating part of the engine so as to be driven at all times during the operation of the engine or a clutch 8 may be interposed in such drive so that the rotary pump 7 may be disconnected from the engine at ony desired time. In such case the clutch 8 comprises the cooperating elements 9 and 10 with the usual meshing cone-shaped discs and the element 9 may freely rotate upon the shaft 11 of the pump while the element 10 is keyed thereto. A fork-shaped operating arm 12 may be used to shift the element 10 upon the shaft 11 and such fork 12 may be operated from any convenient position by the operator of the vehicle.

Figure 2:
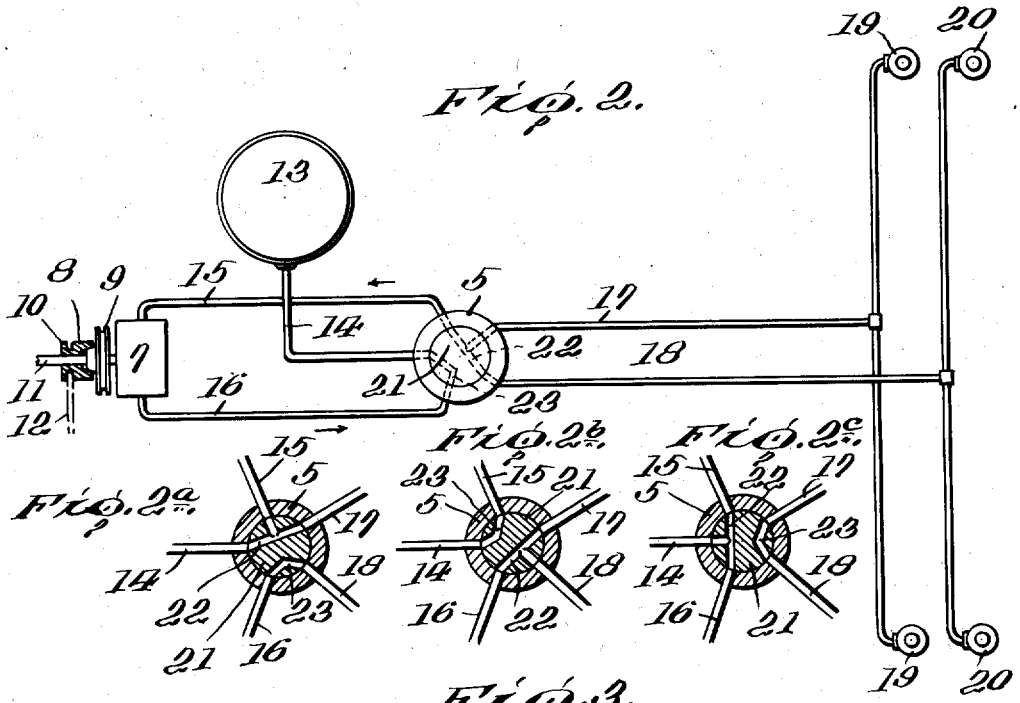
Figure 2 is a diagrammatic view illustrating the fluid actuating means for raising the automobile top.

The container for the fluid, which is preferably oil, is shown at 13 and such container is connected by the pipe line 14 with the valve 5 as shown particularly in Figure 2. The rotary pump 7 is also connected to the valve 5 by means of the pipe lines 15 and 16. Also extending from the valve 5 are the pipe lines or conduits 17 and 18 which extend rearwardly to the operating cylinders 19 and 20 for raising the top.

With regard to the top raising construction it will be understood that only one set of fittings are shown and hereafter described but that two sets are employed one on each side of the vehicle body. The operating cylinders 19 on each side of the vehicle body are operated in unison and the same applies to the cylinders 20. By the admission of oil under pressure through the conduits 17 and 18 the plungers in the cylinders 19 and 20 are operated so as to raise the top. The distribution of the oil under pressure is controlled by manipulating the handle 6 of the valve 5 to the various positions shown in Figures $2^a$, $2^b$ and $2^c$.

The valve 5 has as outlined above the conduits 14, 15, 16, 17 and 18 connected to the outer fixed shell and which communicate with corresponding bores provided in such shell. At the center of the valve as shown more particularly in Figure 9 there is a cylindrical rotating portion 21 which is provided with a T-shaped port 22 having three outlets and an annular port 23 having two outlets which are designed to cooperate with the bores provided in the fixed portion of the valve to which the conduits 15 to 18 are connected. In order to raise the top the valve is first manipulated by the operating member 6 to the position shown in Figure $2^a$ and when the valve is in this position oil will be drawn from the reservoir 13 to the conduit 14 to the inlet conduit 15 for the pump then through the outlet conduit 16 from the pump and supplied to the conduit 18 under pressure whereby the operating cylinder 20 is set in operation. The valve is then turned to the position shown in Figure $2^b$ by the operating handle 6 and when the valve is in this position the oil will be supplied from the reservoir 13 through the conduit 14 to the inlet conduit 15 to the outlet conduit 16 and then supplied to the T-shaped port 22 to both of the conduits 17 and 18 which will thereby supply oil under pressure to the operating cylinders 19 and 20.

Thereafter when the top has been raised to the proper position the valve is turned to the position shown in Figure 2 and in such position it will be noted that oil from the cylinders 19 and 20 is drawn back through the conduits 17 and 18 through the T-shaped bore 22 to the inlet conduit 15 of the pump and then forced through the outlet conduit 16 through the annular port 23 of the valve to the conduit 14 leading to the reservoir 13. In such position of the valve the cylinders 19 and 20 are quickly evacuated of the oil therein.

If the pump 7 is directly coupled to the engine so that it is in operation at all times when the engine is in operation then the valve 5 may be left in the position shown in Figure 2 since the rotating portion of the pump will, after the operating cylinders 19 and 20 have been evacuated, only operate upon air and no damage will be done and the wear upon the rotary pump is negligible.

If desired however the valve may be turned to the position shown in Figure $2^c$ wherein a closed circuit is set up and in such case the rotary pump will continuously drive the oil around in a closed circuit. In Figure $2^c$ the conduits 17 and 18 are connected by the annular port 23 thereby closing such conduits. At the same time the conduits 14, 15 and 16 are connected by the T-shaped bore 22 so that as the pump draws oil along the inlet conduit 15 such oil is merely circulated through the closed path 15, the pump 7, the outlet conduit 16 and the T-shaped bore 22. Oil is supplied from the reservoir 13 through the conduit 14 so as to keep such closed circuit constantly supplied with oil. In such a setting of the valve, which is the most efficient when the operating mechanism for the automobile top is inactive, the conduits 17 and 18 and the operating cylinders 19 and 20 are not subjected to a constant vacuum as is the case when the valve is set in the position shown in Figure 2. If the pump is connected to the engine through the medium of the clutch 8 instead of the direct connection, then in such case it is also advisable to leave the valve 5 in the position shown in Figure 2c during inactive periods. Referring to Figure 9 the central revolving portion 21 of the valve has connected thereto a shaft 24 which extends through the dashboard 4 and on this shaft 24 the handle member 6 is fixed in any desired way. The dashboard is also provided with indicia indicating the different positions of the valve. The cylindrical portion 21 of the valve is held within the fixed outer shell of the valve 5 by a plate 25 which is fastened to the fixed portion through the medium of the screws 26. The plate 25 is provided with a threaded collar portion 27 which is also spaced from the shaft 24 so as to provide room for the packing 28. The packing 28 is compressed through the medium of the collar member 29 sliding on the shaft 24 and having a beveled edge 30 tending to compress the packing against the shaft 24. The collar 29 is forced inwardly against the packing by the screw threaded collar or cap 31 which is threaded upon the member 21. A washer 32 is preferably disposed about the shaft 24 at the base of the packing 28 and a washer 33 preferably of leather is located between the fixed portion of the valve 5 and the plate 25 in order to prevent any leakage at such point.

The actual top raising construction will now be described. This comprises the operating cylinders 19 and 20 previously mentioned located at each side of the vehicle body. The top raising action comprises two separate actions. In the first place the general assembly is raised by the operating cylinders 20 to a substantially vertical position and after such vertical position has been attained then the operating cylinders 19 come into action and extend the lazy tong construction to their extended position so that the front of the top may be secured to the windshield. The operating cylinders 19 are fixedly secured to the brackets 34 which in turn are secured to the central pillars 35 of the vehicle body. On the other hand the operating cylinders 20 are pivotally mounted at their bottoms by the pivot 36 to the supporting brackets 37 placed upon the floor 38 of the automobile. There is sufficient resiliency in the conduit 18 at the bend 39 so as to permit the slight tilting required by the cylinder 20. A plunger 40 is secured to the piston reciprocating in the cylinder 20 and such plunger is at its free end pivotally connected at 41 to the link 42. The link 42 is pivotally connected at 43 to the abutment 44 provided upon the upper cap 45 of the operating cylinder 19. The operating cylinder 19 is secured to the bracket 34 through the medium of the cap 45 which is secured thereto by the bolts 46.

The upper end of the link 42 is provided with a pin 47 which slides in the slot 48 of the flange member 49 fixed to the tubular member 50.

The tubular member 50 is fixed to a collar member 51 at its lower end which in turn is provided with ears 52 which are pivoted to the ears 53 upon the cap member 45 at the pivot 54.

Figure 1:
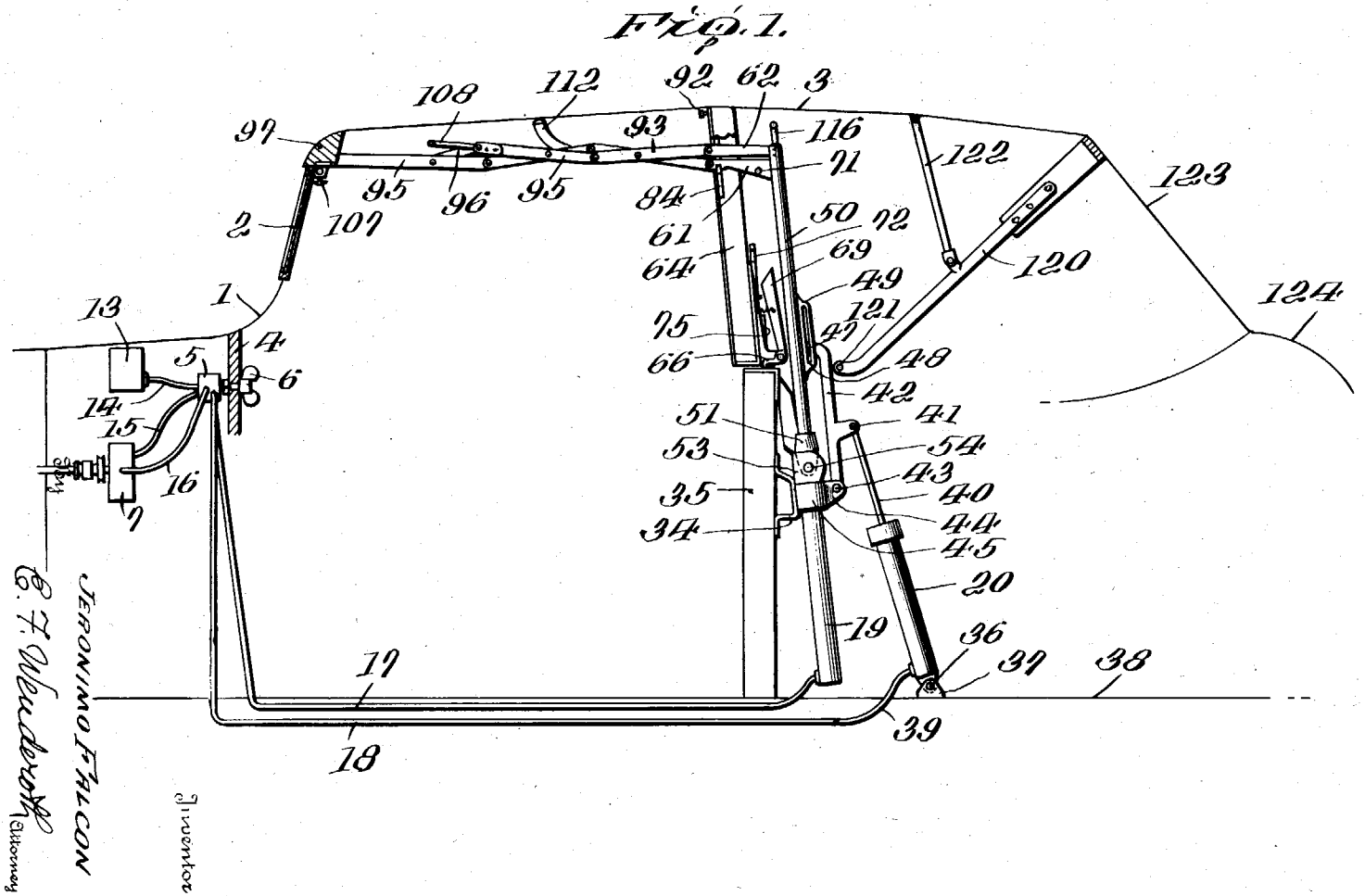
Figure 1 is a partial side elevation of an automobile showing the invention applied thereto.

The operating cylinder 19 has a plunger 55 connected to the piston 56 and such plunger 55 comprises two articulated portions 56 and 57 which are pivoted together at the point 58. The construction is such that the plunger 55 will be reciprocated within the tubular member 50 when the tubular member 50 is in its upright position as shown in Figures 1 and 4. Also when the plunger 55 has been withdrawn into the cylinder 19 due to the action of the spring 59 the pivot point 58 will align with the pivot 54 and in such case the tubular member 50 together with the upper portion 57 of the plunger may be swung backwardly and collapsed into the position shown in Figure 5.

The tube 50 is provided with a longitudinal extending slot 60 in which slides one base member 61 of the lazy tongs construction which is fixed by means of rivets or otherwise to the top portion of the plunger portion 57. The other base member 62 of the lazy tongs construction is fixedly secured by any desired means to the top of the tube member 50. A retraction of the plunger 55 therefore will have the effect of separating the base elements 61 and 62 of the lazy tongs and thereby collapsing them from the full line position shown in Figure 4 to the dotted line position shown therein. The operation of the plunger 40 of the cylinder 20 will therefore raise the lazy tongs and associated mechanism with the lazy tongs in folded position from the position shown in Figure 5 to the position shown in Figure 6. Then the operation of the plungers 55 of the cylinders 19 will bring the member 61 adjacent the member 62 and thereby extend the lazy tongs and thereby extend the top over the automobile. During the preliminary raising movement the pin 47 of the link 42 will ride in the slot 48 from the extreme right-hand position shown in Figure 5 to the position shown in Figures 4 and 6. The above constitutes the main operating elements of the invention. Some accessory features will not be described. Also pivotally mounted upon the pivot point 54 is a bracket member 63 of the shape particularly shown in Figure 5. Such bracket member 63 has secured thereto fixedly the main bow member 64. A projecting arm 65 is also provided upon the bracket member 63 to which is pivoted the latch 66. The latch 66 cooperates with a recess 67 provided in the central pillar 35 so that when the lazy tongs assembly reaches upright position the latch 66 will snap into the recess 67 due to the action of the spring 68 upon the arm 69 of the latch member thereby locking the lazy tongs assembly in upright position. The arm 69, however, has a cam surface 70 which cooperates with a pin 71 upon the member 61 so that the latch 66 will not snap into the recess 67 until the plunger 55 has moved the member 61 upwardly and the pin 71 releases the arm 69. When the lazy tongs are collapsed due to the action of the plunger 55 then in such case the pin 71 will release the latch 66 from the recess 67 thereby permitting the backward folding of the lazy tongs assembly.

If it is desired to maintain the lazy tongs assembly in upright position but with the lazy tongs collapsed, then the sliding bolt lock shown particularly in Figures 6, 7 and 8 may be used. This comprises a sliding bolt 72 having a projecting shoulder 73 designed to lock over the member 61. The bolt 72 cooperates with a recess 74 provided in the pillar 35. The bolt 72 is capable of up and down movement in the member 75 which is secured by screws or any other desired fastening means to the bow member 64. Fixed to the bolt 72 is a threaded bolt 76 which slides in a slot 77 provided in the member 75. A spring 78 encircles the bolt 76 and tends to urge the bolt 72 towards the back portion 79 of the slot 80 provided in the member 75 for the bolt 72. A wing nut 81 is threaded on the bolt 76. Above the member 75 there is provided on the bolt 72 a pin 82 against which the spring 83 acts which abuts at its lower end the top portion of the member 75. Normally therefore the spring 83 tends to maintain the bolt 72 out of the recess 74.

However when the lazy tongs assembly is to be locked in the so-called "town car" position then the bolt 72 is pushed downwardly so as to engage the lower end thereof in the recess 74 and the uper end against the member 61 of the lazy tongs. Thereafter the wing nut 81 is tightened firmly against the member 75 and the lazy tongs will thereby be prevented from opening. In this position it will be noted that springs 78 and 83 are both in compresesd position. Therefore as soon as wing nut 81 is loosened the bolt 72 will move upwardly due to the spring 83 and at the same time the spring 78 will come into action so as to throw the hook portion 73 clear of the member 61 thereby freeing the lazy tongs. In addition to the above locks there is also provided a lock which also cooperates with the member 61 when the lazy tongs are in their extended position. Such lock is shown particularly in Figures 3 and 4 and details thereof in Figures 14 and 21. This lock comprises the latches 84 pivoted at the pivot points 85 upon the main bow 64 and are urged inwardly by the coil springs 86 also fixed upon the central bow 64. As may be seen from Figure 21 particularly the latches are of such form that when the member 61 is urged upwardly such member will act against a lower edge of the latch 84 and force it outwardly against the pressure of the spring 86 and when the member 61 reaches the position shown particularly in Figures 3 and 21 the hook-shaped portion 87 of the latch will snap under the bottom edge of the member 61 thereby locking the member 61 and accordingly the lazy tongs in extended position.

In order to release the latches so as to permit collapsing of the lazy tongs each latch is provided with an extending arm 88 to which is pivotally connected the operating rods 89 which have at their overlapping central portions as shown particularly in Figure 14 rack teeth 90. The rack teeth mesh with a gear 91 provided with an operating handle 92. Upon rotation of the handle 92 in clockwise direction as shown in Figure 14 the latches 84 will be pivoted upon the pivot points 85 against the action of the spring 86 and the member 61 will be released from the latches so that the lazy tongs may be collapsed.

The lazy tongs construction comprises the pivotally connected links 93 which in turn have one of their ends pivoted to the members 61 and 62, the pivotally connected links 94 which have one of their ends connected to the free ends of the links 93 and the pivotally connected links 95 and 96 which have their free ends in turn pivotally connected to the free ends of the links 94. The link 96 is in reality only a half a link while the link 95 extends forwardly beyond the pivot point between the links 95 and 96 and has its free end connected to the bar 97 constituting the forward end of the top. The bar 97 has secured thereto spaced eyelet blocks 98 shown particularly in Figures 3, 11 and 13. The blocks 98 are secured to the bar 97 by the screws 99 or any other suitable fastening means. Each block 98 is provided with a transversely extending aperture 100, which is conically shaped and flares in the direction towards the center of the car as shown particularly in Figure 11.

Mounted upon the upper border of the windshield 2 are the transversely extending locking bars 101. The ends of the bars 101 are tapered as shown at 102 of Figure 11. Bearings for the rods 101 are provided at 103 and also at the central portion. The overlapping inwardly directed ends 104 of the bars 101 are provided with rack teeth 105 with which cooperates a gear member 106 which is operated by the handle member 107. Upon rotation of the handle 107 in a clockwise direction as is clearly evident from Figure 12 the bars 101 will have their outer ends 102 retracted inwardly and will thereby release the same from the eyelet blocks 98 and upon withdrawal of the rods 101 from the slots 100 the forward bar 97 of the top construction is entirely released from the windshield thereby permitting a collapsing of the top. A locking of the bar 97 to the windshield follows the reverse order.

Instead of the usual bow construction extending entirely across the vehicle top a series of partial bows are used. Extending from the forward end of one of the links 94 there is an extension 108. This extension 108 is shown particularly in Figures 17 and 18. The partial bow has a flattened portion 109 provided with apertures 110 for the reception of screws or other securing means for attaching the extension to the link 94. At the free end there is provided an inwardly extending portion 111. This extension is mainly designed for throwing the fabric covering clear of the lazy tongs construction so as to positively prevent any pinching thereof by the lazy tongs.

Extending from one of the links 93 is a partial bow extension 112. This extension 112 is shown particularly in Figures 19 and 20 and comprises a flattened portion 113 having screw receiving apertures 114 for attaching the same to the link 93. The portion of the extension 112 extending from the flattened portion 113 is curved in the manner shown at 115 in Figures 19 and 20. This extension serves not only to throw the fabric clear of the lazy tongs but also serves as a support for the fabric when the lazy tongs are in extended position.

In addition to these extensions 108 and 112 there is also provided the extension 116 located at the top of the tubes 50. The extension 116 is of the form shown in Figures 15 and 16 and comprises the flattened portion 117 having the screw apertures 118 therein which may accommodate bolts if desired for securing the extension 116 to the tubes 50. The free ends of the extensions 116 are formed as shown at 119 in Figures 15 and 16. This extension serves to throw the fabric clear of the lazy tongs and prevent pinching and pass the fabric efficiently behind the rear seat with appropriate folding thereof.

There is also provided in the top construction the usual back bow 120 pivoted at 121 to the side frame of the vehicle or at any other point desired. Pivoted to this back bow 120 is the supplementary bow 122. There is no operating mechanism provided for positively operating the bows 120 and 122. The reason for this is that as the lazy assembly is raised from a collapsed position then in such case the fabric itself will act as a power means for raising the back bow 120 and the supplementary bow 122. Upon a collapse of the top construction gravity will bring the back bow 120 and the supplementary bow 122 to the collapsed position.

The fabric top covering is indicated at 123 and is secured to the tonneau 124 in any desired manner and is secured to the forward bar 97 in any desired manner such as by tacking, adhesives, etc.

It is believed that the operation of the device is self-evident from the above description. Upon placing the valve 5 in the position shown in Figure 2[a] the plungers 40 are operated and the lazy tongs assembly is brought into upright position and then when such assembly is in upright position the valve 5 is turned to the position shown in Figure 2[b] and in such case the plungers 55 are operated so as to extend the lazy tongs. Then the valve 5 is placed in the position shown in Figure 2 so as to evacuate the oil from the operating cylinders 19 and 20. Such positioning of the valve in order to secure evacuation of the cylinders 19 and 20 is, however, not done until after the latches 64 have snapped into position so as to lock the lazy tongs in extended position and the forward bar has been secured to the windshield 2 by means of the locking bars 101 and the cooperating sockets 98. After such locking of the top structure then the cylinders 19 and 20 are evacuated by placing the valve in the position shown in Figure 2. After the cylinders 19 and 20 have been evacuated, which takes an exceedingly short time the valve may be, if desired, left in the position of Figure 2, or is preferably placed in the position shown in Figure 2[c] in which case a closed circuit of oil is set up as previously described. The pumps 7 may be disconnected from the rotating engine part by the clutch 8 if desired.

A preliminary automatic locking of the lazy tongs assembly in upright position is accomplished through the medium of the latch 66. The latch 66 requires no manual operation since its operation is entirely automatic.

An exact synchronization of the operation of the valve 5 with the operation of the lazy tongs assembly is not particularly necessary since if the valve 5 should be turned into the position shown in Figure 2[b] before the tube 50 and associated parts has reached the upright position shown in Figure 1 then in such case the plunger 55 would not be operated since it would be locked in position due to the pivotal connection between the plunger elements 56 and 57 at 58. However pressure would not be built up in the cylinder 19 due to the fact that such pressure is being relieved by the operation of the plunger 40 and as soon as the tube 50 is in upright position and the plunger elements 56 and 57 are aligned then in such case the plunger 55 may operate for extending the lazy tongs. Therefore as apparent the preliminary position of the valve as shown in Figure 2[a] may be eliminated and the valve placed originally in the position shown in Figure 2[b]. It is also possible to merely have two positions of the valve, that shown in Figure 2[b], which will operate in the manner indicated above and the evacuation position shown in Figure 2. However the other positions are desirable in order to secure efficient operation and to prevent strain upon the various parts.

The modification shown in Figures 22 to 28 will now be described. The construction shown in these figures is essentially the same as that shown in Figure 1 but instead of the link 42 cooperating with the plunger 40 there is provided in this modification an arc-shaped cam track 125, which cooperates with a roller 126 fixed to the plunger 40. The operating cylinder 20 is in this case fixedly secured to the floor 38 by the plate 127. The arc-shaped cam track 125 is fixedly secured to the tube 50 in the position indicated and in this case the cylinder 20 may also be fixedly secured to the cylinder 19 by the bracket 128. The operation is believed to be self-evident from the showing particularly in Figure 23 where the extended position of the lazy tongs assembly is shown in full lines while the collapsed position is shown in dotted lines.

In this modification instead of one valve controlling the entire operation there is provided two valves upon the dashboard 4 as valves 129 and 130. Valve 129 is a four-way valve as shown particularly in Figures 25 and 26 and valve 130 is a three-way valve as shown in Figures 27 and 28. The connections are as follows and as shown particularly in Figure 22. A conduit 131 leads from the oil reservoir 13 to one port of the valve 129. A pump inlet conduit 132 is connected to another port of the valve 129. A third port of the valve 129 is connected by conduit 133 to the outlet port of the pump 7. The fourth port of the valve 129 is connected by conduit 134 to a port in the three-way valve 130. The other two ports of the three-way valve 130 are connected by conduits 135 and 136 with the operating cylinders 19 and 20 respectively. The valves 129 and 130 are generally constructed in the same manner as the previously described valve 5 and are equipped with appropriate operating handles and indicia. The four-way valve is only turned into two positions and in order to control the same there is provided a pin and slot construction 137. The same applies to the three-way valve, which is therefore also provided with a pin and slot construction 138 for likewise limiting the two positions in which the valves may be placed.

The control of the oil pressure as applied to the cylinders 19 and 20 in this modification is as follows. When conduit 131 is connected with conduit 132 and conduit 134 is connected with conduit 133 by the four-way valve 129 and conduit 134 is connected to both of the conduits 135 and 136 by the three-way valve then in such case pressure will be supplied to the cylinders 19 and 20 and the lazy tongs assembly will be raised. However an actuation of the cylinders 19 and 20 may be accomplished in sequence by proper manipulation of the three-way valve 130 and an evacuation of the cylinders 19 and 20 may be accomplished by a reversal of flow through the various conduits controlled by the four-way valve 129. By manipulating the two valves 129 and 130 a variety of operations may be secured.

The operation of the above construction is essentially similar to the previous modification. The various locking features as well as the prevention of the pinching of the canvas top is also present in this modification.

In the modification of the operating cylinders illustrated in Figures 29 and 30 the cylinder casing is shown at 140 in which reciprocates a plunger 141 having secured thereto at its end a plate 142. The top of the cylinder is closed by the cap 45 mounted upon the bracket 34 which in turn is secured to the pillar 35. Extending between the plate 142 and the cap 45 is the spring 143. The plate 142 is provided with a series of notches 144 about the periphery thereof.

Below the plate 142 in the cylinder 140 is an upright floating piston indicated generally by the reference character 145. This floating piston comprises a main body 146 and the washers 147 placed upon opposite sides of the body 146. The washers are preferably made of leather. The washers 147 and the main body 146 are apertured so as to receive the bolt 148. The head 149 of the bolt is disposed on the side towards the plate 142 and secures one of the washers 147 against the body 146. The bolt 148 is threaded at its other end and receives the nut 150. The threaded portion 151 of the bolt is sufficiently long so as to serve as a stop and prevent the floating piston from blocking the feed pipe 152 for the oil. The feed pipe 152 corresponds to any one of the conduits 17, 18, 135 and 136.

A metallic washer 153 is inserted between the lower leather washer 147 and the nut 150. If desired a metallic washer may be interposed between the head 149 of the bolt and the upper leather washer 147.

With the construction just described the floating piston 145 will move upwardly and downwardly on the same level with the oil and thereby avoid any formation of a vacuum. The notches in the plate 142 permit the air to circulate freely upon both sides of the plate. The construction will not only make it easier to draw out the oil from the cylinders but will also make the operation of lowering the top easier because the plunger rod 141, which corresponds to any of the plunger rods 40 and 55, may reciprocate easily in the cylinder.

It will be noted that the collapsing movement of the lazy tongs is confined to substantially a horizontal plane and therefore gravity does not influence their collapsing movement. The spring 143 is compressed when the top is raised and the lazy tongs extended and therefore constantly exerts a force tending to collapse the lazy tongs. After the top has been raised or extended it is secured in its raised or extended position by the clamping means 107, the oil which was pumped into the cylinder 140 to cause extension of the lazy tongs is drained therefrom and the piston 145 is thereby lowered to a position where it offers no interference to subsequent lowering of the rod 141. When it is subsequently desired to lower the top the clamping means 107 is released and the force exerted by the spring 143 becomes effective to assist in collapsing the lazy tongs. The spring 143 is preferably strong enough to initiate collapsing movement of the lazy tongs and to move them a substantial fraction of their total collapsing movement without the aid of manual pressure.

When the means shown in Fig. 29 is used in conjunction with the rod 40 it functions similarly to initiate swinging movement of the bow member 64 to its lowered position. Therefore, it becomes obvious that by operating both plunger rods 40 and 55 by means such as shown in Fig. 29 the top may be completely collapsed by spring pressure.

In Figure 7ª there is illustrated a modified construction which may take the place of the pump, the operating mechanism for the pump and the reservoir. Such modification comprises what is termed a master cylinder and has a cylinder 155 having a nipple 156 at the bottom thereof to which the conduits leading to the operating cylinders may be directly connected. The cylinder 155 is closed at the end opposite to the nipple 156 by a plate 157 having a threaded aperture therein through which extends the threaded plunger 158. The end of the plunger within the cylinder 155 has secured thereto the piston 159 having the usual leather washers 160. A coupling member 161 comprising a socket 162 and a threaded end 163 is preferably used for securing the piston to the inner end of the plunger 158. A nut 164 clamps the plates 165 about the leather washers 160.

The other end of the plunger 158 has secured thereto a pin 166 which slides in the diagrammatically opposed slots 167 of the sleeve member 168. The sleeve member 168 is operated by means of a reversible motor not shown and which is connected to one end of the sleeve 168. As will be noted a rotation of the sleeve 168 will cause a rotation of the plunger 158 and a motion inwardly or outwardly of the piston attached to the plunger within the cylinder 155. In this manner the fluid preferably oil is placed under pressure and forced to the operating cylinders or such fluid is withdrawn by suction from the operating cylinders. The construction shown in Figure 7ª constitutes a simplified construction for operating the operating cylinders and thereby raising the top.

It is understood that the modifications above described are preferred constructions and should not be interpreted as limiting the invention.

I claim:

1. A top for an automobile and the like comprising a lazy tong device, means for extending said lazy tong device, said means comprising a cylindrical casing, a plunger reciprocating in said casing, a plate fixed to the end of said plunger within said casing, means upon said plate permitting a free passage of air to either side thereof, a floating piston positioned below said plate and an inlet upon said casing through which oil under pressure may be supplied to said casing.

2. A collapsible top for an automobile having a body comprising a lazy tong construction, a bar pivoted to said body to swing from substantially horizontal to substantially vertical position carrying said lazy tong construction, means for extending said construction, separate means for locking said lazy tong construction at each end in its extended position, means for pivoting said bar and means for automatically locking said bar when in substantially vertical position.

3. A collapsible top for an automobile having a body comprising a lazy tong construction, a bar pivoted to said body to swing from substantially horizontal to substantially vertical position carrying said lazy tong construction, means for extending said construction, means for pivoting said bar, and a pivoted latch connected to said bar for automatically locking said bar when in substantially vertical position.

4. A collapsible top for an automobile having a body comprising a lazy tong construction, a bar pivoted to said body to swing from substantially horizontal to substantially vertical position carrying said lazy tong construction, means for extending said construction, separate means for locking said lazy tong construction at each end in its extended position, means for pivoting said bar, and manually operated means connected to said bar for locking said bar when in substantially vertical position .

5. A collapsible top for an automobile having a body comprising a lazy tong construction, a tube pivoted to said body to swing from substantially horizontal to substantially vertical position carrying said lazy tong construction, a fluid operated plunger for extending said lazy tong construction reciprocating in said tube, said plunger having articulated portions, a piston connected to said plunger, a cylinder in which said piston reciprocates, a pivoted link connecting said tube and said cylinder and a second fluid operated plunger coacting with said link to swing said tube from substantially horizontal to substantially vertical position.

6. A collapsible top for an automobile having a body comprising a lazy tong construction, a tube pivoted to said body to swing from substantially horizontal to substantially vertical position carrying said lazy tong construction, a fluid operated plunger for extending said lazy tong construction reciprocating in said tube, said plunger having articulated portions, a piston connected to said plunger, a cylinder in which said piston reciprocates, an arc shaped cam track mounted upon said tube and a second fluid operated plunger coacting with said cam track to swing said tube from substantially horizontal to substantially vertical position.

7. A collapsible top for an automobile having a body comprising a lazy tong construction, a bar pivoted to said body to swing from substantially horizontal to substantially vertical position carrying said lazy tong construction, means for extending said construction, means for pivoting said bar, a bow member connected to said bar, a slidingly mounted bolt on said bow member cooperating with a fixed recess in said automobile body, resilient means normally holding said bolt out of said recess, a shoulder on said bolt cooperating with said lazy tong construction to lock the same when in collapsed and vertical position and a second resilient means cooperating with said bolt to hold said shoulder normally out of contact with said lazy tong construction.

8. A collapsible top for an automobile having a body comprising a lazy tong construction, a bar pivoted to said body to swing from substantially horizontal to substantially vertical position carrying said lazy tong construction, means for extending said construction, means for pivoting said bar, a pivoted latch connected to said bar for automatically locking said bar when in substantially vertical position and means upon said lazy tong construction cooperating with said latch to render said latch inoperative when said lazy tong construction is collapsed.

9. A collapsible top for an automobile having a body comprising a lazy tong construction, a bar pivoted to said body to swing from substantially horizontal to substantially vertical position carrying said lazy tong construction, means for extending said construction, means for pivoting said bar, a pivoted latch connected to said bar for automatically locking said bar when in substantially vertical position, a cam surface upon said latch and a pin upon said lazy tong construction cooperating with said cam surface to render said latch inoperative when said lazy tong construction is collapsed.

10. A collapsible top for an automobile having a body comprising a lazy tong construction, a bar pivoted to said body to swing from substantially horizontal to substantially vertical position carrying said lazy tong construction, means for extending said lazy tong construction, fluid pressure means for pivoting said bar, fluid pressure means for operating said means for extending said lazy tong construction and means on said bar for automatically locking said bar when in substantially vertical position.

11. The combination of a convertible top for vehicles and power means for extending the top, said means comprising a cylindrical casing, a rod extending into said casing, said rod being connected to said top in such manner that movement of said rod outwardly of the casing causes raising of the top, a spring in said casing urging movement of said rod inwardly of said casing, a floating piston in said casing adapted to freely abut said rod, means for pumping liquid into said casing to move said piston in a direction to move said rod outwardly of said casing and to compress said spring, means for securing said top in its extended position, and means for draining the liquid from said casing while said top is secured in its extended position to retract said piston whereby said rod is free to move in a top collapsing direction under pressure of said spring upon subsequent release of said securing means.

JERONIMO FALCON.